US006947655B2

(12) United States Patent
Rubino et al.

(10) Patent No.: US 6,947,655 B2
(45) Date of Patent: Sep. 20, 2005

(54) RUGGEDIZED OPTICAL FIBER REARRANGEMENT DEVICE

(75) Inventors: Robert A. Rubino, Tolland, CT (US); Patricia Dawson, Paxton, MA (US); Kevin A. Tabor, Webster, MA (US)

(73) Assignee: Schott Corporation, Yonkers, NY (US)

( * ) Notice: Subject to any disclaimer, the term of this patent is extended or adjusted under 35 U.S.C. 154(b) by 0 days.

(21) Appl. No.: 10/770,719

(22) Filed: Feb. 3, 2004

(65) Prior Publication Data

US 2005/0025439 A1 Feb. 3, 2005

(Under 37 CFR 1.47)

Related U.S. Application Data

(60) Provisional application No. 60/445,377, filed on Feb. 5, 2003.

(51) Int. Cl.$^7$ ................................................ G02B 6/00
(52) U.S. Cl. ...................................................... 385/135
(58) Field of Search ................................ 385/135, 100, 385/114, 115, 121, 54

(56) References Cited

U.S. PATENT DOCUMENTS

| 3,933,556 A | | 1/1976 | Strack |
| 4,026,693 A | | 5/1977 | Sato |
| 4,185,888 A | | 1/1980 | Quelle, Jr. |
| 4,824,194 A | | 4/1989 | Karasawa |
| 4,927,227 A | * | 5/1990 | Bensel et al. ................ 385/135 |
| 4,932,747 A | | 6/1990 | Russel et al. |
| 4,943,136 A | | 7/1990 | Popoff |
| 4,952,022 A | | 8/1990 | Genovese |
| 5,129,030 A | | 7/1992 | Petrunia |
| 5,136,674 A | | 8/1992 | Kakiuchi et al. |
| 5,335,306 A | | 8/1994 | Takita et al. |
| 5,394,503 A | | 2/1995 | Dietz et al. |
| 5,440,665 A | * | 8/1995 | Ray et al. .................... 385/135 |
| 5,450,517 A | * | 9/1995 | Essert ......................... 385/135 |
| 5,715,345 A | | 2/1998 | McKinley |
| 5,857,051 A | | 1/1999 | Travieso et al. |
| 5,862,285 A | | 1/1999 | Danielian et al. |
| 6,017,154 A | | 1/2000 | Carlisle et al. |
| 6,222,976 B1 | | 4/2001 | Shahid |
| 6,243,520 B1 | | 6/2001 | Goldman |
| 6,324,325 B1 | | 11/2001 | Booth et al. |
| 6,351,590 B1 | | 2/2002 | Shahid |
| 6,464,404 B1 | | 10/2002 | Robinson et al. |
| 6,585,524 B2 | | 7/2003 | Robinson et al. |
| 6,600,860 B2 | * | 7/2003 | Sun et al. .................... 385/115 |
| 6,873,772 B2 | * | 3/2005 | Nakaya ....................... 385/114 |
| 2004/0114901 A1 | * | 6/2004 | Baechtle ..................... 385/136 |

* cited by examiner

Primary Examiner—Rodney Bovernick
Assistant Examiner—Mike Stahl
(74) Attorney, Agent, or Firm—Volpe and Koenig, P.C.

(57) ABSTRACT

A ruggedized optical rearrangement device is provided. The device includes an input side having multiple separate flexible input light guide arrays, each of the arrays including multiple light guides. The device also includes an output side in which the light guides are repositioned to form multiple flexible output light guide arrays. A tube positioned between the input and output sides protects a transition region of the plurality of light guides. Adapters are positioned at each end of the tube, and at least one flexible strength element associated with the light guide arrays is connected to the adapters to prevent damage to the light guides. A method for ruggedizing an optical rearrangement device is also provided.

24 Claims, 2 Drawing Sheets

RUGGEDIZED OPTICAL FIBER REARRANGEMENT DEVICE

CROSS REFERENCE TO RELATED APPLICATION

This application claims the benefit of provisional application No. 60/445,377, filed Feb. 5, 2003, which is incorporated by reference as if fully set forth.

BACKGROUND

This invention is related to fiber optic communications and more particularly to an optical fiber interconnection device used for rearranging arrays of optical fibers between an input side and an output side.

The use of fiber optics for high speed communications is finding increased use within large microprocessors and multiple microprocessor systems. In back planes, more optical interconnections are required as more daughter cards are added for increasing the number of channels. Cross connects may also be utilized within back planes for communicating between groups of daughter cards or microprocessors. These applications typically require that each daughter card or microprocessor be in communication with each of the other daughter cards or microprocessors in the system. These communications are achieved by connecting optical fibers in a point to point fashion between each daughter card or microprocessor and the other daughter cards or microprocessors in the system. It can therefore be appreciated that as the number of channels required is increased, the number of daughter cards or microprocessors that must communicate with each other is also increased. This creates a problem in that point to point wiring for large numbers of channels is labor intensive, costly, time consuming, and susceptible to connection errors. Additionally, because optical fibers are subject to environmental limitations such as bend radius, fiber management systems are often employed for such large systems of interconnections. Fiber management becomes a challenging problem as a number of channels and the number of point to point connections are increased resulting in higher fiber counts in the backplane.

In order to address this problem, an optical interconnection device has been developed having arrays of fibers arranged in a given orientation at an input side which are rearranged within the device and exit at an output side with fibers of the arrays being arranged in different relative positions from the input side. While this device has been successful, it is still susceptible to damage during handling. An optical interconnection device of this type is disclosed in U.S. Pat. No. 6,464,404, which is incorporated herein by reference as if fully set forth.

It would be desirable to provide a shuffle device for optical fibers which provides additional protection for the optical fibers and fiber bundles in order to prevent damage to the individual fibers or fiber ribbons, as well as the shuffle region. It would also be desirable to provide an arrangement with increased tensile strength for the fiber ribbons or arrays.

SUMMARY

The present invention provides a ruggedized optical rearrangement device. The device includes an input side having multiple separate flexible input light guide arrays, each of the arrays including multiple light guides. The device also includes an output side in which the light guides are repositioned to form multiple separate flexible output light guide arrays. Repositioning of the light guides takes place in a transition region between the input and output sides. A flexible, crush resistant tube positioned between the input and output sides protects the transition region and the light guides therein. Adapters are positioned at each end of the tube and partially fit within the tube. At least one flexible strength element, preferably in the form of one or more strands of Aramid yarn, is associated with the light guide arrays and is connected to the adapters to prevent stressing of the light guides. The invention also provides a method for ruggedizing an optical rearrangement device.

BRIEF DESCRIPTION OF THE DRAWINGS

The invention will now be described by way of example with reference to the accompanying figures of which.

DETAILED DESCRIPTION OF THE PREFERRED EMBODIMENT(S)

Figure 1:
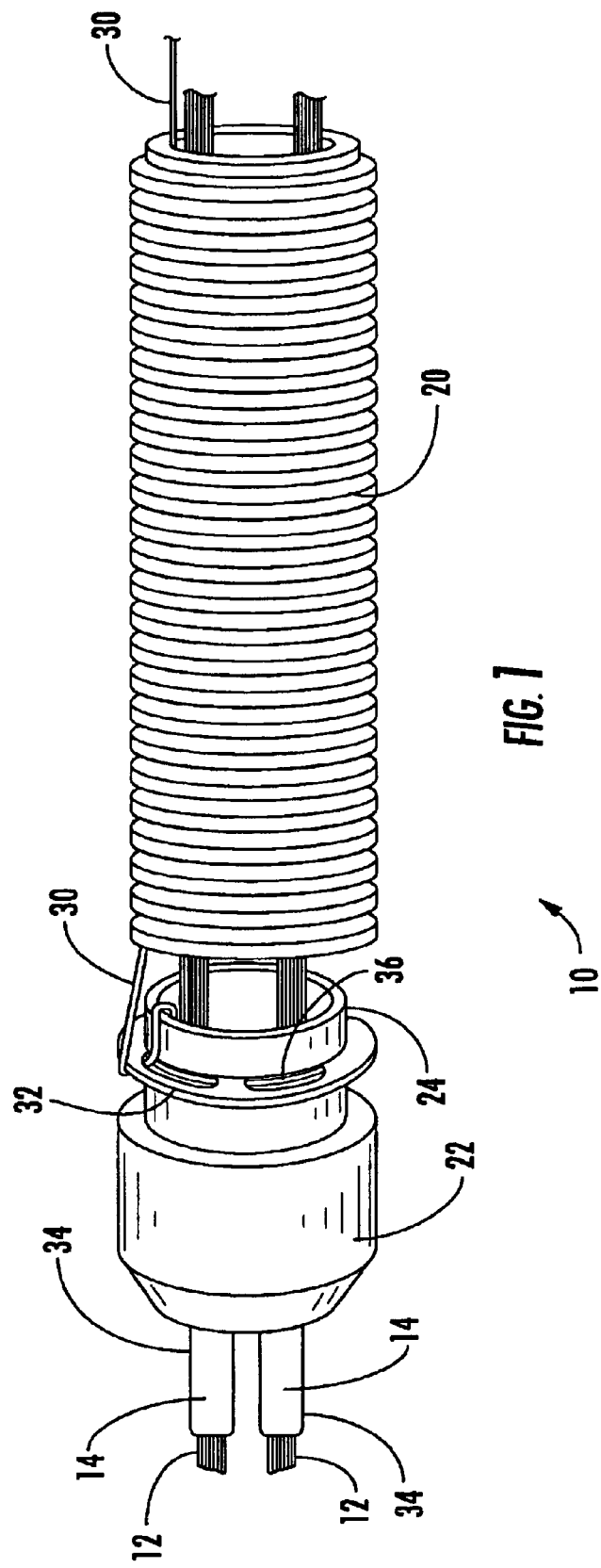
FIG. 1 is a partial perspective view, shown partially disassembled, of a ruggedized shuffle in accordance with the present invention.
Figure 2:
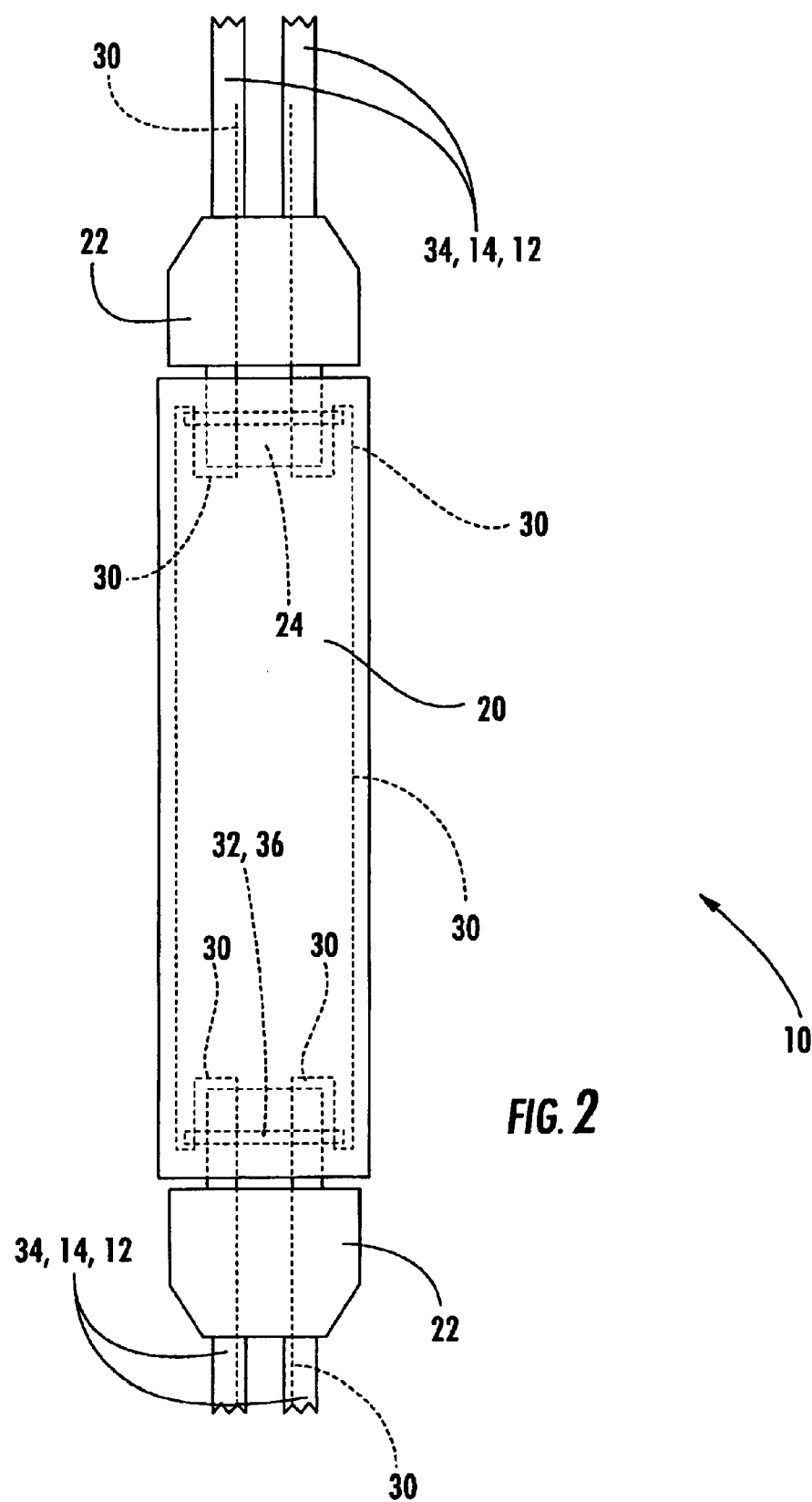
FIG. 2 is an elevation view of the ruggedized shuffle of FIG. 1 shown fully assembled.

Referring now to the drawing figures, a ruggedized optical shuffle rearrangement device 10 in accordance with the present invention is shown. The rearrangement device 10, or shuffle, includes arrays of individual fibers 12 arranged into ribbons 14 at input and output ends which are rearranged within a three-dimensional optical fiber rearrangement area, or shuffle transition region, located between the ends in a similar manner to that disclosed in U.S. Pat. No. 6,464,404. In order to protect the optical fibers and fiber ribbons 12, 14 from damage, the rearrangement device 10 includes a flexible crush-resistant tube 20 in the rearrangement area. The tube 20 is preferably formed of a polymeric material and may be smooth or corrugated. The shuffle transition of the fibers 12 between the input and output sides is located within the tube 20, and the ribbons 14 of optical fibers 12 extend from both the input and output sides. For clarity, the fiber ribbons 14 and the rearrangement of the optical fibers 12 are not shown within the tube in FIGS. 1 and 2. However, the fibers 12 of the input arrays 14 are rearranged within the device into arrays of output fibers in which the fibers are located in different relative positions than in the input fiber arrays 14.

An adapter 22 having a reduced diameter portion 24 is insertable into each end of the tube 20. Preferably a flexible strength element 30, such as one or more strands of monofilament or multifilament Aramid yarn, is associated with each optical fiber ribbon 14, and extends into or through the tube 20 and is fastened in place on the adapter 22 in order to provide a strain relief. In this manner, damage to the optical fibers resulting from tensile forces is prevented. The strength element 30 is preferably attached without an adhesive by using a clip 32, which preferably has a ring shape and is sized to fit over the reduced diameter portion 24 of the adapter 22. Preferably, a groove 36 is provided on the portion 24 to receive the clip 32. A strength element 30 associated with each of the optical fiber ribbons 14 is looped under the clip 32 so that it is connected to the adapter. This is preferably done for each optical fiber ribbon 14, and a strength element 30 is incorporated into each of the input and output ribbons 14 at each end of the device 10. While an Aramid yarn is preferred, other high modulus flexible strength elements may be utilized.

Preferably, the strength elements 30 are a continuous length of yarn which extends from an input ribbon 14 through the tube 20 and to an output ribbon 14. The strength elements 30 preferably pass along a periphery of the inner portion of the tube to avoid interference with the fiber transition region. Alternatively, discontinuous strength elements 30 which do not pass through the tube may be utilized since elements 30 are attached to the adapters 22 at each end of the device 10.

Preferably, the ribbons 14 of optical fibers 12 are encapsulated by a mechanically and chemically resistant jacket 34 formed from a suitable material. Preferably this is a flexible high-strength polymeric material which also has a flammability rating in order to protect the device 10 and the optical fibers 12 from heat or fire damage. Preferably the strength elements 30 associated with each ribbon 14 of optical fibers 12 are held in place via the jacket 34.

Based on the use of the flexible strength elements 30, which are preferably strands of Aramid yarn, the strength of each individual input and output ribbon 14 is increased. Additionally, due to each of the strength elements 30 being mechanically attached to the adapter 22 of the shuffle and being isolated from the optical fibers 12 in the rearrangement area, damage to the optical fibers 12 due to entanglement with a stressed strength element 30 is also avoided.

While the preferred embodiments of the invention have been described in detail, the invention is not limited to the specific embodiments described above, which should be considered as merely exemplary. Further modifications and extensions of the present invention may be developed, and all such modifications are deemed to be within the scope of the present invention as defined by the appended claims.

What is claimed is:

1. A ruggedized optical rearrangement device comprising:
   an input side including at least first and second separate, flexible input light guide arrays, each of the arrays including a plurality of light guides;
   a transition region in which the light guides of the at least first and second input light guide arrays are repositioned to form at least first and second separate, flexible output light guide arrays which extend from an output side;
   a tube positioned between the input and output sides to protect the transition region of the plurality of light guides;
   first and second adapters positioned respectively at each end of the tube;
   at least one flexible strength element connected to at least one of the first and second adapters and connected to at least one of the light guide arrays to prevent damage to the light guides.

2. The optical rearrangement device according to claim 1, wherein the tube comprises a cylindrical flexible crush resistant body which contains the plurality of light guides therein.

3. The optical rearrangement device according to claim 1, wherein the first and second adapters each include a hollow body which engages the tube, and wherein the light guide arrays pass through the hollow body.

4. The optical rearrangement device according to claim 3, wherein the strength element includes at least one yarn which passes into the hollow body and is connected with at least one of the light guide arrays.

5. The optical rearrangement device according to claim 3, wherein the hollow body includes a stepped portion which is positioned within the tube.

6. The optical rearrangement device according to claim 5, wherein the flexible strength element includes at least one yarn, and the device further comprises a clip which connects to the stepped portion of the hollow body to retain the at least one yarn.

7. The optical rearrangement device according to claim 6, wherein the hollow body includes a groove on an outer surface of the stepped portion, and wherein the clip is mounted in the groove.

8. The optical rearrangement device according to claim 1, further comprising at least one jacket which encloses at least one of the light guide arrays, wherein the flexible strength element is connected to at least one of the light guide arrays by the jacket.

9. The optical rearrangement device according to claim 1, wherein the at least one flexible strength element includes separate flexible strength elements which are individually associated with each of the input and output light guide arrays.

10. The optical rearrangement device according to claim 1, wherein the at least one flexible strength element is connected to the first and second adapters and is associated with at least one of the flexible input light guide arrays and at least one of the flexible output light guide arrays to prevent the light guide arrays from disassociating from the optical rearrangement device.

11. The optical rearrangement device according to claim 10, further comprising a first jacket which contains at least one of the input light guide arrays and a second jacket which contains at least one of the output light guide arrays.

12. The optical rearrangement device according to claim 11, wherein the at least one flexible strength element includes at least one yarn having first and second ends.

13. The optical rearrangement device according to claim 12, wherein the first end of the at least one yarn is retained by the first jacket and the second end of the at least one yarn is retained by the second jacket, and wherein the yarn passes through the adapters and the tube.

14. The optical rearrangement device according to claim 1, wherein each of the input and output light guide arrays includes at least one ribbon of light guides.

15. The optical rearrangement device according to claim 1, wherein the at least one strength element comprises at least one yarn.

16. A method of ruggedizing an optical rearrangement device which includes an input side having at least first and second separate, flexible input light guide arrays, each of the arrays including a plurality of light guides, an output side in which the light guides of the at least first and second input light guide arrays are repositioned to form at least first and second separate, flexible output light guide arrays, and a transition region disposed between the input and the output sides for repositioning the light guides, the method comprising:
   providing a flexible, crush resistant tube to protect the transition region;
   providing a first adapter;
   connecting the first adapter to at least one of the first and second ends of the tube at the input and output sides;
   connecting at least one strength element to the first adapter; and
   connecting the at least one strength element to at least one of the flexible input or output light guide arrays.

17. The method according to claim 16, further comprising providing at least one jacket which at least partially encloses at least one of the light guide arrays, and enclosing at least a portion of the at least one strength element within the jacket to connect the at least one strength element to at least one of the light guide arrays.

18. The method according to claim 16, further comprising providing a second adapter, and wherein the step of connecting the first adapter further includes connecting the second adapter to the other of the first and second ends of the tube at the input and output sides.

19. The method according to claim 18, further comprising connecting the at least one strength element to the second adapter, and connecting the at least one strength element to at least one of the flexible input and one of the flexible output light guide arrays.

20. The method according to claim 19, wherein the step of connecting the at least one strength element includes passing the at least one strength element through the tube within the transition region.

21. The method according to claim 20, further comprising isolating the at least one strength element from the plurality of light guides.

22. The method according to claim 18, wherein the steps of providing the adapters include providing at least one of the adapters with a stepped portion, and placing the stepped portion of at least one of the adapters into the tube to connect the adapter to the tube.

23. The method according to claim 16, further comprising providing a clip for connecting to the first adapter, and attaching the at least one strength element to the first adapter using the clip to connect the at least one strength element to the first adapter.

24. The method according to claim 23, wherein the step of attaching the at least one strength element to the first adapter using the clip includes attaching the clip to a groove in the stepped portion of the first adapter.

* * * * *